United States Patent [19]
Fello et al.

[11] Patent Number: 5,999,385
[45] Date of Patent: Dec. 7, 1999

[54] GROUND FAULT CIRCUIT BREAKER

[75] Inventors: Joseph P. Fello, Verona; Wayne G. Adamson, Coraopolis; Garry B. Theadore, Beaver Falls, all of Pa.; William Rivera, Aguas Buenas, Puerto Rico

[73] Assignee: Eaton Corporation, Cleveland, Ohio

[21] Appl. No.: 09/233,633

[22] Filed: Jan. 19, 1999

[51] Int. Cl.[6] ........................................... H02H 3/00
[52] U.S. Cl. ........................ 361/42; 361/45; 361/93; 361/115
[58] Field of Search ........................ 361/42, 45, 93, 361/115, 23, 24, 25

[56] References Cited

U.S. PATENT DOCUMENTS

| | | | |
|---|---|---|---|
| 3,081,386 | 3/1963 | Koenig et al. | 200/88 |
| 4,000,444 | 12/1976 | Douglas et al. | 361/42 |
| 4,549,153 | 10/1985 | Forsell et al. | 335/16 |
| 4,616,206 | 10/1986 | Bridges et al. | 337/71 |
| 4,929,919 | 5/1990 | Link et al. | 335/38 |
| 5,260,676 | 11/1993 | Patel et al. | 335/18 |
| 5,293,522 | 3/1994 | Fello et al. | 335/18 |
| 5,301,083 | 4/1994 | Grass et al. | 361/64 |

*Primary Examiner*—Stephen W. Jackson
*Attorney, Agent, or Firm*—Martin J. Moran

[57] ABSTRACT

A reverse fed single pole miniature ground fault circuit breaker includes a housing, a line termination on the lower portion of the housing, and a load termination on the upper portion of the housing. Separable contacts are disposed between the line termination and the load termination. A handle and operating mechanism form a manual mechanism for manually operating the separable contacts. The handle has an upper position in which the separable contacts are closed and a lower position in which the separable contacts are open. A ground fault circuit interruption trip circuit opens the separable contacts in response to predetermined ground fault current conditions and is powered through those separable contacts. In this manner, when a power source is electrically interconnected with the line termination on the lower portion of the housing, when the handle is in the upper position, and when there is none of the predetermined ground fault current conditions, the ground fault circuit interruption trip circuit receives power through the separable contacts.

8 Claims, 4 Drawing Sheets

GROUND FAULT CIRCUIT BREAKER

BACKGROUND OF THE INVENTION

1. Field of the Invention

This invention relates to circuit breakers and, more particularly, to ground fault circuit breakers.

2. Background Information

Ground fault circuit breakers are generally old and well known in the art. Examples of ground fault circuit breakers are disclosed in U.S. Pat. Nos. 5,260,676; and 5,293,522. Ground fault circuit breakers are used to protect people and electrical circuitry from damage due to an overcurrent condition, such as an overload condition, a relatively high level short circuit, or ground fault condition.

In small circuit breakers, commonly referred to as miniature circuit breakers, used for residential and light industrial applications, overcurrent protection is typically provided by a thermal-magnetic trip device. This trip device includes a bimetal which is heated and bends in response to a persistent overload condition. The bimetal, in turn, unlatches a spring powered operating mechanism which opens the separable contacts of the circuit breaker to interrupt current flow in the protected power system.

In one circuit breaker, the thermal characteristic responds, for example, to 30 A being drawn in a 15 A circuit. On the other hand, an armature, which is attracted by the sizable magnetic forces generated in a magnetic core by a short circuit also unlatches, or trips, the operating mechanism. As an example, the magnetic type actuation occurs when the hot line conductor becomes directly connected with ground or neutral, thereby bypassing the load.

In many applications, a miniature circuit breaker may provide ground fault protection. Typically, an electronic circuit detects leakage of current to ground and generates a ground fault trip signal. This trip signal energizes a trip solenoid, which unlatches the operating mechanism, often through deflection of the armature of the thermal-magnetic trip device.

Ground fault circuit breakers include both Class A (e.g., ground fault current of about 5 mA for people protection) and equipment protective devices (e.g., ground fault current of about 30 mA).

A common type of ground fault detection circuit is the dormant oscillator detector including first and second sensor coils. The line and neutral conductors of the protected circuit pass through the first sensor coil. The output of this coil is applied through a coupling capacitor to an operational amplifier followed by a window comparator having two reference values. A line-to-ground fault causes the magnitude of the amplified signal to exceed the magnitude of the reference values and, thus, generates a trip signal. At least the neutral conductor of the protected circuit passes through the second sensor coil. A neutral-to-ground fault couples the two detector coils which causes the amplifier to oscillate, thereby resulting in the generation of the trip signal. See, for example, U.S. Pat. Nos. 5,260,676; and 5,293,522, which are incorporated herein by reference.

Often, conventional circuit breakers are positioned to provide up and down movement of the circuit breaker handle as shown in FIG. 1. Normally, the line terminal is located at the top portion and the load terminal is located at the bottom portion of the circuit breaker.

Typically, local codes require that equipment provided by original equipment manufacturers (OEMs) be configured such that the "ON" position of the circuit breaker handle is in the up direction and the "OFF" position of the circuit breaker handle is in the down direction. In that instance, for circuit breakers which do not provide ground fault protection, the line terminal is located at the top and the load terminal is located at the bottom of the circuit breaker.

Often, OEMs choose to wire their equipment from the bottom of the circuit breaker such that the non-ground fault protection circuit breaker provides a "line" terminal (actually its intended load terminal) and a "load" terminal (actually its intended line terminal) which are located at the bottom portion and top portion, respectively, of the breaker. This is easily accomplished by "reverse feeding" the non-ground fault circuit breaker from its intended load terminals as is shown in FIG. 2.

In conventional ground fault circuit breakers, the ground fault detection circuit is powered from the load side of the circuit breaker such that the ground fault detection circuit is not powered after the circuit breaker has detected a ground fault and, thus, has tripped. In this manner, the circuit breaker separable contacts are employed as a cut-off switch to remove power to the ground fault detection circuit and, thus, protect such detection circuit.

In the event that ground fault protection is to be retrofitted into an existing OEM product in which a non-ground fault circuit breaker had previously been "reverse fed" (see FIG. 2), the OEM must redirect the wiring (e.g., within the OEM product as shown in FIG. 3, or by providing an external enclosure for the ground fault circuit breaker). Accordingly, there is room for improvement.

SUMMARY OF THE INVENTION

The invention is directed to a circuit breaker including a housing, a line termination on the lower portion of the housing, and a load termination on the upper portion of the housing. Separable contacts are between the line termination and the load termination. A means for manually operating the separable contacts has an upper position in which the separable contacts are closed and a lower position in which the separable contacts are open. A means for opening the separable contacts in response to predetermined ground fault current conditions is powered through the separable contacts. When the power source is electrically interconnected with the line termination on the lower portion of the housing, and when the means for manually operating the separable contacts is in the upper position, and when there is none of the predetermined ground fault current conditions, then the means for opening the separable contacts receives power through the separable contacts.

In this manner, the circuit breaker may be reverse fed from the line termination on the lower portion of the housing, the means for manually operating the separable contacts may employ the conventional upper and lower positions to respectively close and open the separable contacts, and the means for opening the separable contacts may receive power only when the separable contacts are closed. This simplifies the wiring to the circuit breaker in OEM products and eliminates the need to employ an external enclosure for the circuit breaker.

As a preferred refinement, the line termination, the separable contacts and the load termination are connected in series for the power circuit, and the means for opening the separable contacts includes means for sensing ground fault current flowing between the line termination and the separable contacts, and means for receiving power from the series connection of the separable contacts and the load termination.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described as applied to a single pole miniature circuit breaker of the type commonly used in residential and light industrial applications. Residential and industrial lighting and appliance branch circuit breakers of the narrow width type are known, for example, as shown in U.S. Pat. Nos. 3,081,386, 4,549,153, 4,616,206, 4,929,919, and 5,301,083, which are incorporated herein by reference. Such circuit breakers provide overcurrent protection. However, it will be evident to those skilled in the art that the invention is also applicable to other types of circuit breakers (e.g., double pole circuit breakers) as well.

Figure 1:
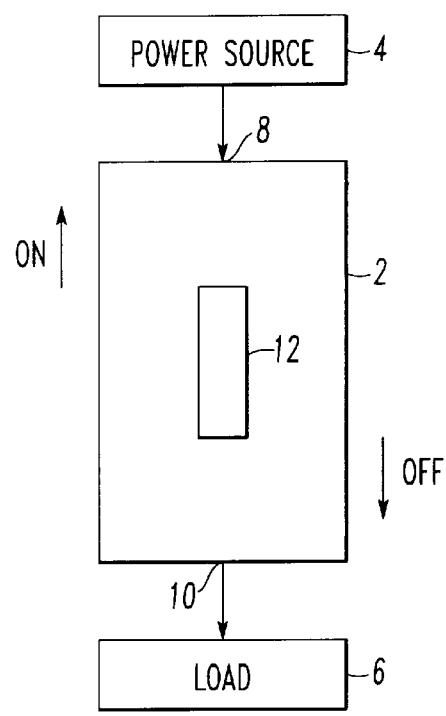
FIG. 1 is a schematic diagram of a power circuit for a conventional circuit breaker.

Referring to FIG. 1, a conventional circuit breaker 2 is employed in a power circuit having a power source 4 and a load 6. The circuit breaker 2 has a line terminal 8 located at its top portion, a load terminal 10 located at its bottom portion, and a handle 12. In the up position of the handle 12, the circuit breaker 2 is "ON" and the power source 4, which is connected to the line terminal 8, is electrically interconnected with the load terminal 10, which is connected to the load 6. In the down position of the handle 12, the circuit breaker 2 is "OFF" and the power source 4 is electrically disconnected from the load 6.

Figure 2:
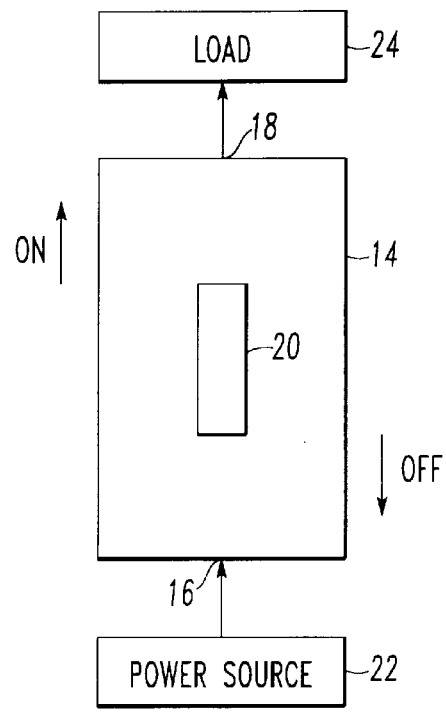
FIG. 2 is a schematic diagram of a power circuit for a conventional reverse fed circuit breaker.

As shown in FIG. 2, a conventional non-ground fault circuit breaker 14 may be reverse fed from its intended load terminal 16 to its intended line terminal 18 at the respective bottom and top portions of the breaker. In the up position of the handle 20, the circuit breaker 14 is "ON" and the power source 22, which is connected to the load terminal 16, is electrically interconnected with the line terminal 18, which is connected to the load 24. In the down position of the handle 20, the circuit breaker 14 is "OFF" and the power source 22 is electrically disconnected from the load 24.

Figure 3:
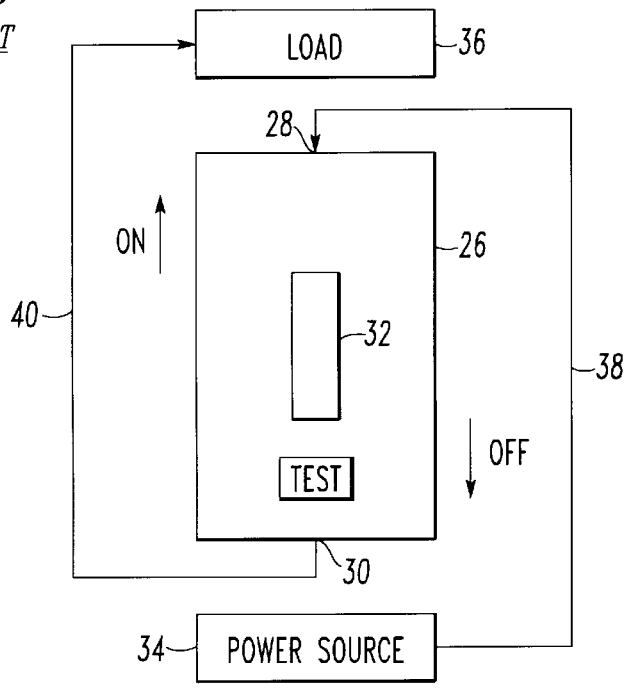
FIG. 3 is a schematic diagram of a power circuit for a conventional ground fault circuit breaker.

Referring to FIG. 3, a power circuit for a conventional ground fault circuit breaker 26 in an OEM product (not shown) is illustrated. The circuit breaker 26 is conventionally fed from its line terminal 28 at the top portion to its load terminal 30 at the bottom portion of the breaker. In the up position of the handle 32, the circuit breaker 26 is "ON" and the power source 34, which is connected to the upper line terminal 28, is electrically interconnected with the lower load terminal 30, which is connected to the load 36. In the down position of the handle 32, the circuit breaker 26 is "OFF" and the power source 34 is electrically disconnected from the load 36. In this case, the power wiring 38 is redirected from the bottom of the circuit breaker 26 to the upper line terminal 28, and the load wiring 40 is redirected from the top of the circuit breaker 26 to the lower load terminal 30.

Figure 4:
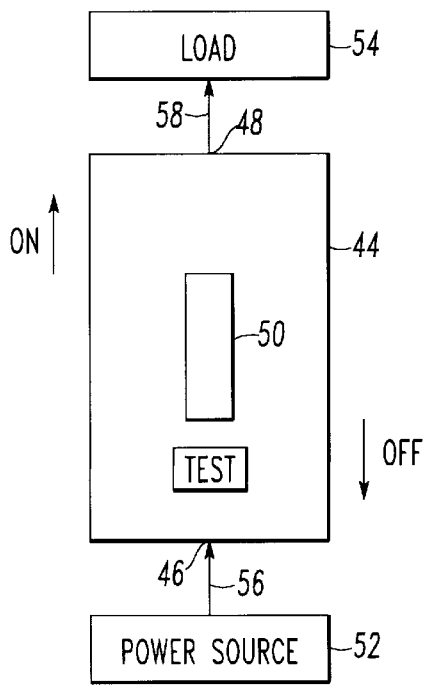
FIG. 4 is a schematic diagram of a power circuit for a reverse fed ground fault circuit breaker in accordance with the invention.

FIG. 4 illustrates a power circuit for a reverse fed ground fault circuit breaker 44 in accordance with the invention. The circuit breaker 44 is reverse fed (i.e., from its bottom to its top) from the line termination 46 to the load termination 48 at the respective bottom and top portions of the breaker. In the up position of the handle 50, the circuit breaker 44 is "ON" and the power source 52, which is connected to the line termination 46, is electrically interconnected with the load termination 48, which is connected to the load 54. In the down position of the handle 50, the circuit breaker 44 is "OFF" and the power source 52 is electrically disconnected from the load 54. In this case, the power wiring 56 is directed from the bottom of the circuit breaker 44 to the lower line termination 46, and the load wiring 58 is directed from the top of the circuit breaker 44 to the upper load termination 48.

Figure 5:
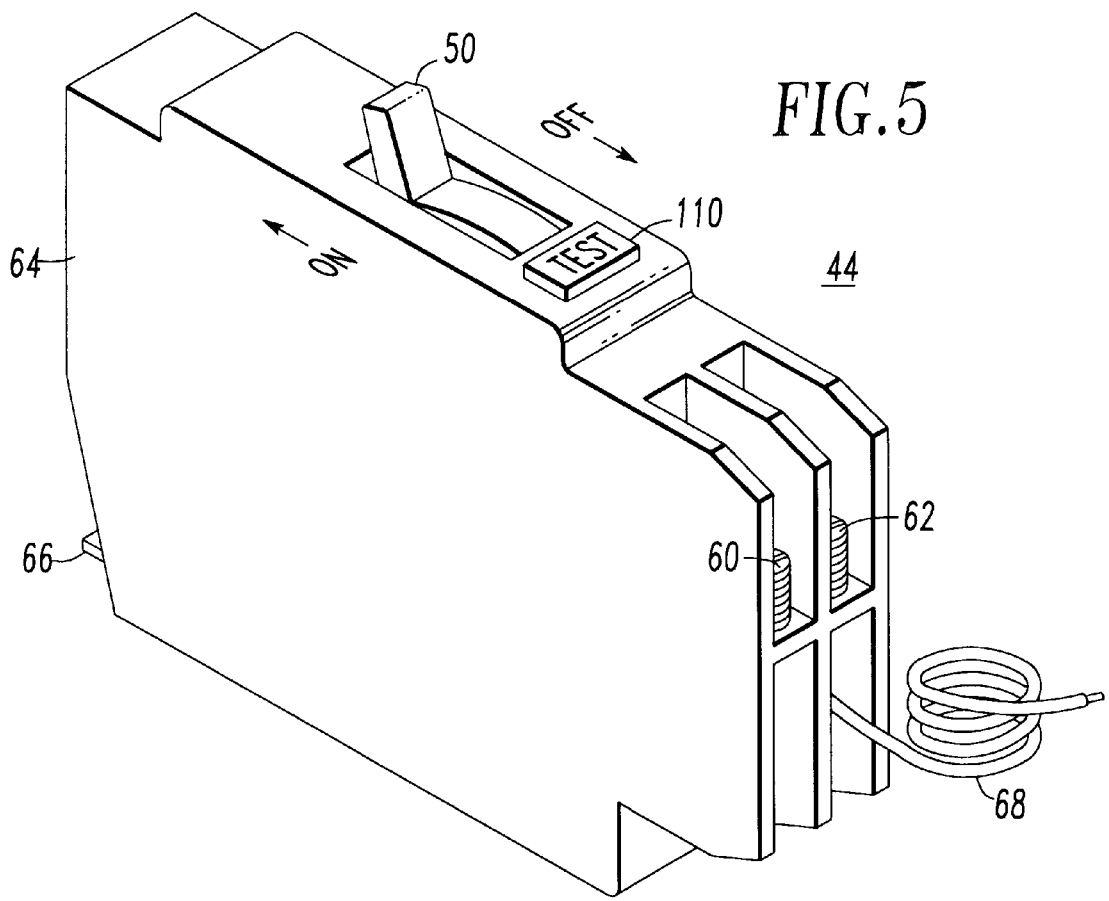
FIG. 5 is an isometric view of the circuit breaker of FIG. 4.

Referring to FIG. 5, the exemplary reverse fed single pole miniature ground fault circuit breaker 44 includes the line termination 46 (see FIG. 6), such as the exemplary terminal (or line connection) 60 and terminal (or line neutral connection) 62, provided at the bottom portion of housing 64 for connecting the circuit breaker 44 to a power line, such as the power source 52 of FIG. 4. The housing 64 is preferably assembled from a number of molded sections composed of an electrically insulating material, as is well known. The load termination 48 (see FIG. 6), such as the exemplary stab (or load connection) 66 at the top portion of the housing 64 and a pigtail (or load neutral connection) 68 at the bottom portion of the housing 64, connects the circuit breaker 44 to a load, such as the load 54 of FIG. 4. The molded handle 50 projects from housing 64 for manually opening and closing the circuit breaker 44.

Although exemplary line and load terminations are disclosed, it will be appreciated that a wide variety of terminations or connections may be employed. As a further non-limiting example, the load termination may include a pair of terminals (not shown) both located at the top portion of the housing 64.

Figure 6:
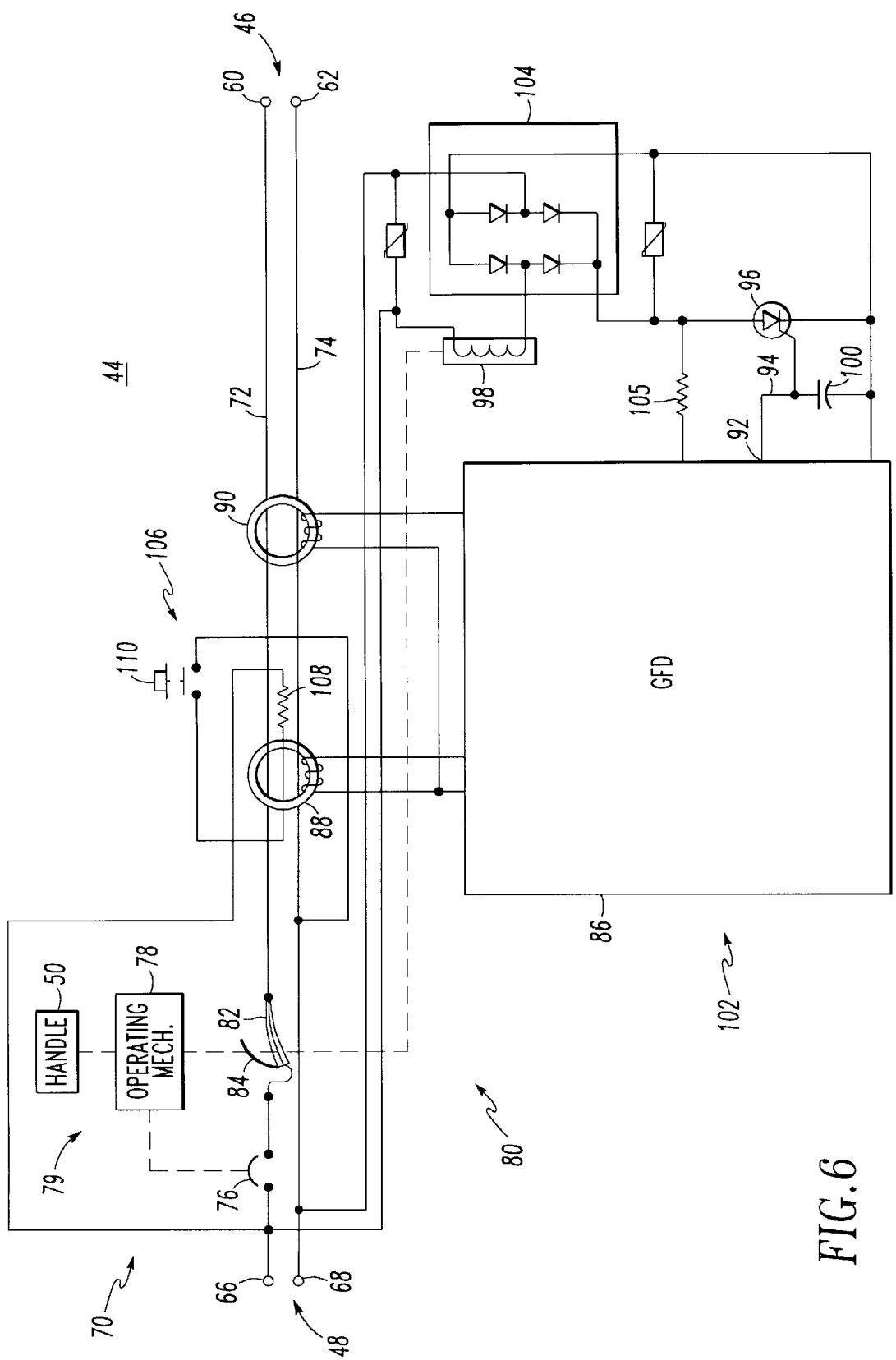
FIG. 6 is a schematic circuit diagram of the circuit breaker of FIG. 5.

As shown in FIG. 6, the circuit breaker 44 of FIG. 5 is connected in an electric power circuit 70 which has a line conductor 72 and a neutral conductor 74. The circuit breaker 44 includes main separable contacts 76 which are mounted in the housing 64 of FIG. 5 and which are connected in the line conductor 72. The line connection 60, the separable contacts 76 and the load connection 66 are connected in series for the power circuit 70. Also, the first neutral connection 62 is electrically connected to the second neutral connection 68.

The separable contacts 76 are opened and closed by an operating mechanism 78. The handle 50 and the operating mechanism 78 form a mechanism 79 for manually operating the separable contacts 76. The handle 50 has an upper position (with respect to the upper portion of the housing 64 of FIG. 5) in which the separable contacts 76 are closed and a lower position (with respect to the lower portion of the housing 64) in which the separable contacts 76 are open.

In addition to being operated manually by the handle 50, the operating mechanism 78 can also be actuated to open the separable contacts 76 by a trip assembly 80 in response to predetermined current conditions. The trip assembly 80 includes the conventional bimetal 82 which is heated by persistent overloads and bends to actuate the operating mechanism 78 to open the separable contacts 76. An armature 84 in the trip assembly 80 is attracted by the large magnetic force generated by very high overcurrents to also actuate the operating mechanism 78 and provide an instantaneous trip function. The operating mechanism 78 and trip assembly 80 cooperate to open the main separable contacts 76 in response to predetermined current conditions, with the operating mechanism 78 opening the contacts 76 when actuated, and the trip assembly 80 actuating the operating mechanism 78 in response to predetermined current conditions.

The circuit breaker 44 is also provided with a ground fault detector (GFD) 86. The GFD 86 may be of the well known dormant oscillator type in which case it utilizes an exemplary pair of sensing coils 88,90 to detect both line-to-ground and neutral-to-ground fault current conditions. When the GFD 86 detects a ground fault, it generates at output 92 a ground fault trip signal 94 which is active in response to the ground fault. The trip signal 94 turns a silicon controlled rectifier (SCR) 96 "ON" which, in turn, energizes the trip solenoid 98 to open the separable contacts 76 in response to the ground fault. A capacitor 100 protects the gate of the SCR 96 from voltage spikes and false tripping due to noise.

Continuing to refer to FIG. 6, the exemplary circuit breaker 44 contains both a thermal/magnetic trip function, which is provided by the bimetal 82 and armature 84, as well as a ground fault circuit interruption (GFCI) trip function. The GFD 86, the SCR 96 and the trip solenoid 98, which unlatches the operating mechanism 78 through deflection of the armature 84, form a GFCI trip circuit 102 which opens the separable contacts 76 in response to predetermined ground fault current conditions. In this manner, the trip assembly 80 includes both the bimetal 82 and armature 84, which open the separable contacts 76 in response to predetermined overcurrent or overload conditions, as well as the GFCI trip circuit 102, which opens the separable contacts 76 in response to the predetermined ground fault current conditions.

The GFD 86 of the GFCI trip circuit 102 is powered through the separable contacts 76 by an exemplary bridge 104. The GFCI trip circuit 102 includes the sensing coils 88,90 for sensing ground fault current flowing between the line connection 60 and the separable contacts 76 and between the first neutral connection 62 and the second neutral connection 68. This trip circuit 102 also includes the bridge 104 which receives power from the series connection of the separable contacts 76 and the load connection 66. In this manner, when the power source 52 of FIG. 4 is electrically interconnected with the line connection 60 on the lower portion of the housing 64 to reverse feed the circuit breaker 44, when the handle 50 is in its upper position, and when there is none of the predetermined ground fault current conditions, then the GFD 86 of the GFCI trip circuit 102 receives power from the power source 52, through the separable contacts 76, through the coil of the solenoid 98, and through the bridge 104.

When the circuit breaker 44 trips, the coil of the solenoid 98 is de-energized. Otherwise, current drawn by the GFD 86 through the coil of the solenoid 98, the bridge 104 and a resister 105 is insufficient to actuate the solenoid 98. When the SCR 96 turns on, the solenoid coil current increases to energize the solenoid 98, which unlatches the operating mechanism 78 through deflection of the armature 84. In turn, the separable contacts 76 open, thereby de-energizing the solenoid 98 which commutates the SCR 96 off.

The GFCI trip circuit 102 further includes a test circuit 106 for testing the GFD 86. The test circuit 106 includes a resistor 108 and a pushbutton 110 which, when pressed, induces the flow of test current between the load connection 66 and the electrical connection of the first neutral connection 62 and the second neutral connection 68. In this manner, a simulated ground fault current flows through the sensor coil 88 which, in turn, is detected by the GFD 86 to initiate the tripping of the circuit breaker 44.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A circuit breaker for a power circuit between a power source and a load, said circuit breaker comprising:
    a housing having an upper portion and a lower portion;
    a line termination on the lower portion of said housing;
    a load termination on the upper portion of said housing;
    separable contacts between said line termination and said load termination;
    means for manually operating said separable contacts having an upper position in which said separable contacts are closed and a lower position in which said separable contacts are open; and
    means for opening said separable contacts in response to predetermined ground fault current conditions, said means for opening said separable contacts being powered through said separable contacts,
    whereby when said power source is electrically interconnected with said line termination on the lower portion of said housing, when said means for manually operating said separable contacts is in the upper position, and when there is none of said predetermined ground fault current conditions, said means for opening said separable contacts receives power through said separable contacts.

2. The circuit breaker of claim 1 wherein said line termination, said separable contacts and said load termination are connected in series for said power circuit; and wherein said means for opening said separable contacts includes means for sensing ground fault current flowing between said line termination and said separable contacts, and means for receiving power from the series connection of said separable contacts and said load termination.

3. The circuit breaker of claim 1 wherein said means for opening said separable contacts includes means for opening said separable contacts in response to said predetermined ground fault current conditions, and means for opening said separable contacts in response to predetermined overcurrent or overload conditions.

4. The circuit breaker of claim 1 wherein said circuit breaker is a single pole miniature circuit breaker.

5. The circuit breaker of claim 1 wherein said line termination includes a line connection and a neutral connection.

6. The circuit breaker of claim 1 wherein said load termination includes a load connection on the upper portion of said housing and a neutral connection on the lower portion of said housing.

7. The circuit breaker of claim 1 wherein said means for opening said separable contacts includes a ground fault detection circuit and means for testing said ground fault detection circuit.

8. A circuit breaker for a power circuit between a power source and a load, said circuit breaker comprising:

a housing having an upper portion and a lower portion;

a line termination on the lower portion of said housing, said line termination including a line connection and a first neutral connection;

a load termination on the upper portion of said housing, said load termination including a load connection on the upper portion of said housing and a second neutral connection on the lower portion of said housing, said first neutral connection being electrically connected to said second neutral connection;

separable contacts between said line termination and said load termination;

means for manually operating said separable contacts having an upper position in which said separable contacts are closed and a lower position in which said separable contacts are open; and means for opening said separable contacts in response to predetermined ground fault current conditions, said means for opening said separable contacts being powered through said separable contacts, said means for opening said separable contacts including a ground fault detection circuit and means for testing said ground fault detection circuit, said ground fault detection circuit including means for sensing ground fault current flowing between said line connection and said separable contacts and between said first neutral connection and said second neutral connection, said means for testing said ground fault detection circuit including means for inducing current flow between said load connection and the electrical connection of said first neutral connection and said second neutral connection, whereby when said power source is electrically interconnected with said line termination on the lower portion of said housing, when said means for manually operating said separable contacts is in the upper position, and when there is none of said predetermined ground fault current conditions, said means for opening said separable contacts receives power through said separable contacts.

* * * * *